(12) United States Patent
Shaffer et al.

(10) Patent No.: US 7,233,578 B1
(45) Date of Patent: *Jun. 19, 2007

(54) NETWORK WITH SELF REGULATING QUALITY OF SERVICE (QOS)

(75) Inventors: Shmuel Shaffer, Palo Alto, CA (US); Rami D. Rubin, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,325

(22) Filed: Oct. 27, 2005

Related U.S. Application Data

(63) Continuation of application No. 09/873,080, filed on Jun. 1, 2001, now Pat. No. 6,977,905.

(51) Int. Cl.
*H04J 3/06* (2006.01)
(52) U.S. Cl. ............... 370/252; 370/352; 370/401
(58) Field of Classification Search ........... 370/253, 370/353, 516, 230, 231, 252, 401, 352
See application file for complete search history.

(56) References Cited

U.S. PATENT DOCUMENTS

| | | | | |
|---|---|---|---|---|
| 5,883,819 | A | 3/1999 | Abu-Amara et al. | 364/578 |
| 6,058,114 | A | 5/2000 | Sethuram et al. | 370/397 |
| 6,119,235 | A | 9/2000 | Vaid et al. | 713/201 |
| 6,170,075 | B1 * | 1/2001 | Schuster et al. | 714/776 |
| 6,215,791 | B1 * | 4/2001 | Kim | 370/412 |
| 6,278,693 | B1 | 8/2001 | Aldred et al. | 370/252 |
| 6,466,548 | B1 | 10/2002 | Fitzgerald | 370/249 |
| 6,529,499 | B1 | 3/2003 | Doshi et al. | 370/352 |
| 6,560,230 | B1 | 5/2003 | Li et al. | 370/395.42 |
| 6,665,317 | B1 * | 12/2003 | Scott | 370/516 |
| 6,744,767 | B1 | 6/2004 | Chiu et al. | 370/395.21 |
| 6,798,745 | B1 | 9/2004 | Feinberg | 370/235 |
| 6,868,094 | B1 * | 3/2005 | Bordonaro et al. | 370/516 |
| 6,977,905 | B1 * | 12/2005 | Shaffer et al. | 370/252 |
| 2002/0039371 | A1 | 4/2002 | Hedayat et al. | 370/516 |

* cited by examiner

*Primary Examiner*—Hassan Kizou
*Assistant Examiner*—Jay P. Patel
(74) *Attorney, Agent, or Firm*—Baker Botts L.L.P.

(57) ABSTRACT

A communications system and method for self-regulating quality of service in a communications network are provided which includes measuring the amount of jitter of a first media stream received in a router, comparing the amount of jitter of the first media stream received in the router to the amount of jitter of at least one other media stream received in the router and prioritizing the timing of the transmission of a packet in the first media stream from the router based at least in part on the results of the comparing step. The communication system and method for self regulating quality of service also provide for self-regulating quality of service in a communications network by receiving at a first router a measurement of the amount of jitter associated with the media stream at a third router and prioritizing the timing of the transmission of a packet in the media stream from the first router via a second router toward the third router based at least in part on the amount of jitter associated with the media stream measured at the third router.

26 Claims, 3 Drawing Sheets

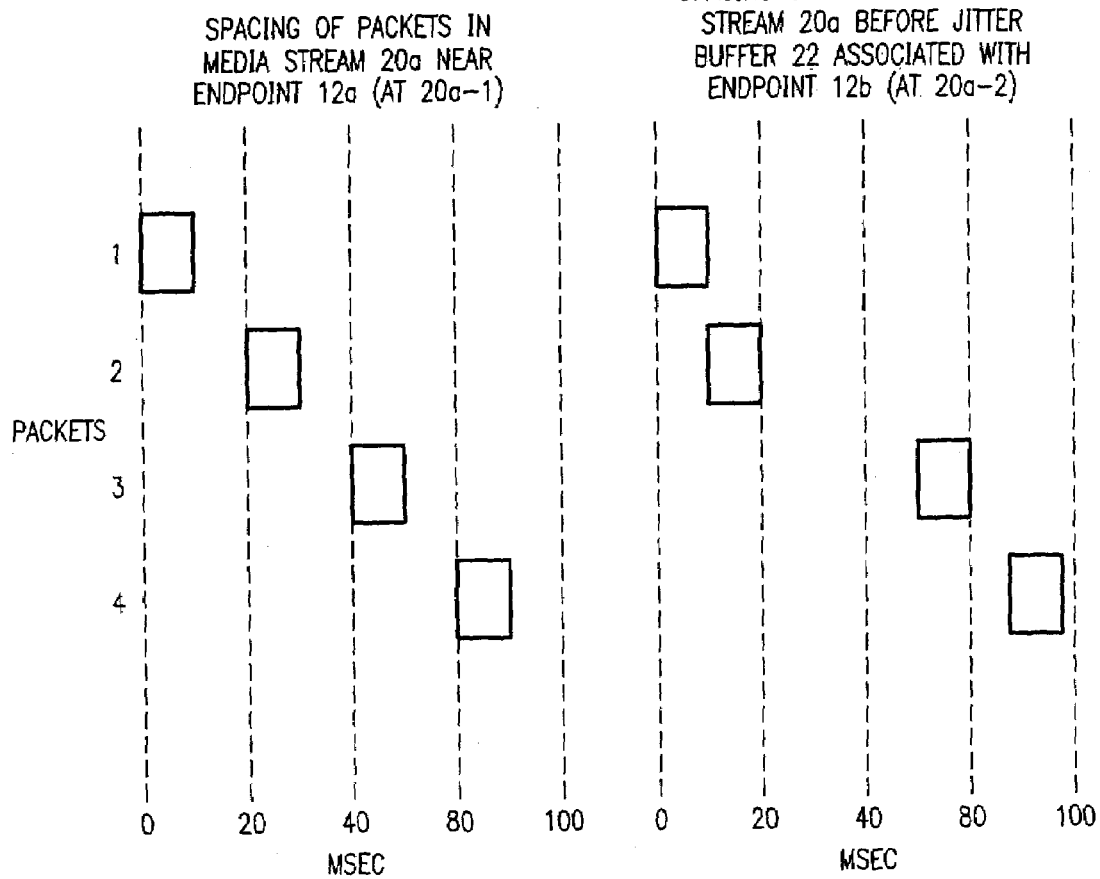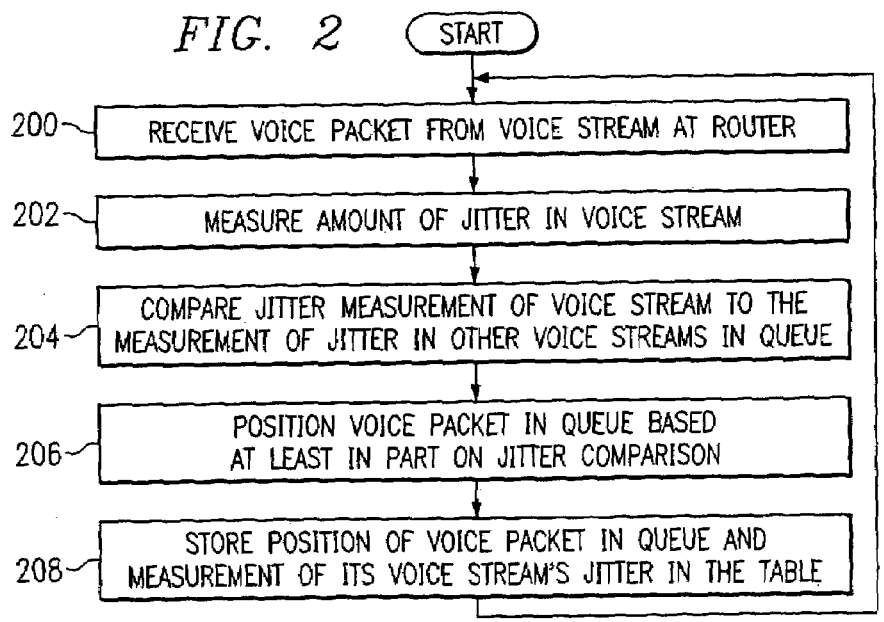

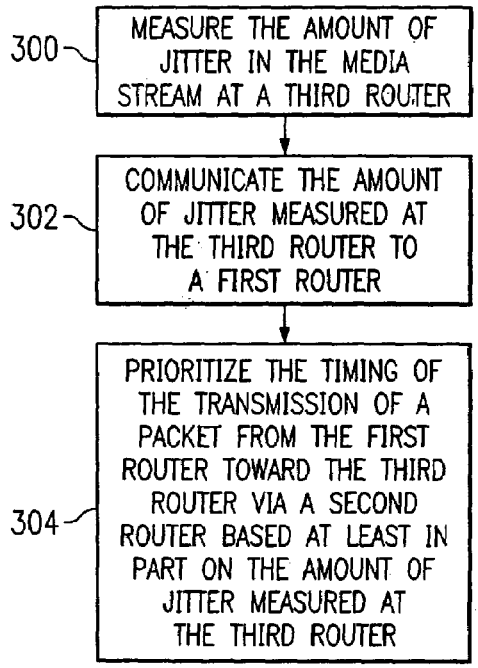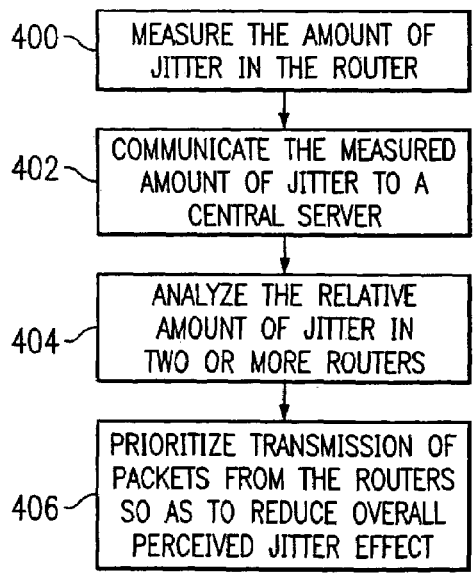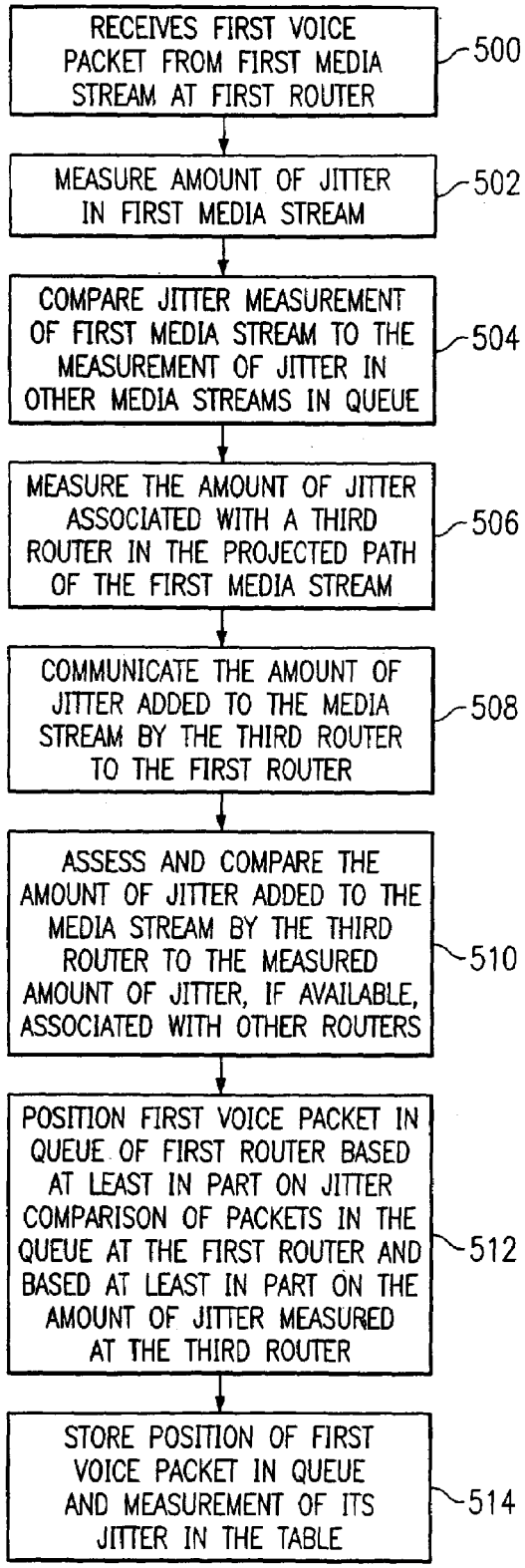

US 7,233,578 B1

NETWORK WITH SELF REGULATING QUALITY OF SERVICE (QOS)

CROSS-REFERENCE TO RELATED APPLICATION

This application is a continuation application of U.S. Ser. No. 09/873,080 filed Jun. 1, 2001 now U.S. Pat. No. 6,977,905 and entitled "Network With Self Regulating Quality of Service (QoS).

TECHNICAL FIELD OF THE INVENTION

This invention relates generally to the field of communications, and more particularly to self-regulating the relative priorities of packets in multiple media streams.

BACKGROUND OF THE INVENTION

Current packet-based communications systems utilize packets that make up a media stream that passes through routers and/or switches as the media stream traverses from its point of origin endpoint to its final destination endpoint. Each router/switch through which the packets pass potentially introduces jitter to the packets of the media stream. Different types of media streams are prioritized as a function of their susceptibility to degradation based on jitter. The most time sensitive media streams typically are the most susceptible to degradation from jitter. For example, voice packets are typically more time sensitive than video packets, which, in turn, are typically more time sensitive than electronic mail packets. As a result, the priority of the packets will be marked accordingly. Packets are given a priority by the originating endpoint. It is the originating point that assigns the priority to the packets. There could be however a scenario where routing or switching is done in such a way that the router knows that the packet contains voice versus video versus email. The routers and switches receiving these types of packets will typically be configured to give higher priority to the voice packet over the video and the electronic mail packets while the video packet will likely be given a higher priority than the electronic mail packet. Thus, packets at a router awaiting transmission from the router will be scheduled for transmission based on the priority associated with the type of each packet awaiting transmission.

SUMMARY OF THE INVENTION

The present invention solves many of the problems and disadvantages associated with prior communications systems. In a particular embodiment, the present invention provides selective priority (i.e., subpriority) among packets of the same priority for transmission of the packets from a router. For example, all voice packets have the same priority, all video packets have the same priority and all email packets have the same priority, but within each of these priorities, under the present invention, subpriorities as established. Self-regulating quality of service refers to the ability of the router to determine and assign these subpriorities to a plurality of packets that are tagged by an originating endpoint with the same priority (e.g. voice packets). Endpoints assign priorities to media streams. However, all voice packets will have the same priority assigned to the packets. The present invention seeks to reduce the jitter and delay to media streams that have voice quality affecting delay and jitter while adding small (unnoticeable) amounts of jitter and delay to media streams that have negligible jitter and delay.

In an aspect of the present invention, the method and system for self-regulating quality of service in a communications network include measuring the amount of jitter of a first media stream received in a router, comparing the amount of jitter of the first media stream received in the router to the amount of jitter of at least one other media stream received in the router, and prioritizing the timing of the transmission of a packet in the first media stream from the router based at least in part on the results of the comparison. The packet in an embodiment is a voice packet. In other embodiments, the packet can be a video or an email, among others. The method and system further include storing the measurement of jitter of the first media stream containing the packet and the at least one other media stream and in prioritizing includes optimizing quality of service. The step of prioritizing includes timing the transmission of the packet before the transmission of a packet from the at least one other media stream when the first media stream has a greater amount of jitter than the at least one other media stream.

In another aspect of the invention, the method and system for self-regulating quality of service in a communications network include receiving at a first router a measurement of the amount of jitter associated with a third router and prioritizing the timing of the transmission of a packet in a media stream from the first router via a second router toward the third router based at least in part on the amount of jitter associated with the third router. The method and system include having the amount of jitter associated with the third router communicated to the first router. In the method and system according to this particular embodiment, the third router prioritizes the timing of the transmission of the packet from the first router. This particular embodiment further includes measuring the amount of jitter associated with the media stream at the third router and communicating the amount of jitter associated with the media stream at the third router to the first router.

In yet another aspect of the invention, the method and system for self-regulating quality of service in a communications network include measuring the level of jitter introduced by each of at least one router in a communication path of the media stream associated with a packet, informing a central server of the level of jitter introduced by each of the at least one router, analyzing at the central server the level of jitter introduced by each of the at least one router and providing input from the central server to at least one router in the communication path based at least in part on the measured amounts of jitter.

In still another aspect of the invention, the method and system for self-regulating quality of service in a communications network include measuring the amount of jitter of a first media stream received in a first router to be transmitted to a second router, comparing the amount of jitter of the first media stream received in the first router to the amount of jitter of at least one other media stream received in the first router, receiving at the first router a measurement of the amount of jitter added to the media stream at a third router and prioritizing the timing of the transmission of a packet in the media stream from the first router via the second router toward the third router based at least in part on the results of the comparison step and at least in part on the amount of jitter added to the media stream at the third router. In an aspect of this embodiment, the packet is a voice packet. Other embodiments can include video packets and email packets among others. In yet another aspect of this embodiment, the method and system include storing the measurement of jitter of the first media stream and the at least one other media stream and the step of prioritizing includes optimizing quality of service. In another aspect of this embodiment, the step of prioritizing includes timing the transmission of the packet before the transmission of a packet from the at least one other media stream when the first media stream has a greater amount of jitter than the at least one other media stream.

Important technical advantages of certain embodiments of the present invention may include, among others, selective priority per connection within the routers based on the jitter of specific media streams, providing preferential treatment to media streams, with high jitter and preventing or at least reducing the degradation below an acceptable level of the voice quality of voice streams. This provides selective priority for one voice stream over another voice stream of the same identically tagged priority.

Another important technical advantage of the present invention may include the subpriority assigned to each media stream based on the measured jitter within that router. A further important technical advantage of the present invention may include the sub-priority assigned based on the end to end jitter measurement as collected by a central server.

Yet another important technical advantage of the present invention may include adding less delay and jitter to voice streams with high jitter and delay that, as a result, will reduce the impact to the perceived voice quality of those voice streams. The greater delay and jitter added to media streams with low jitter and delay will have minimal impact to the perceived voice quality.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 1B is a graphical illustration of jitter as it applies to the present invention;

FIG. 2 is a flow chart illustrating an aspect of the present invention;

FIG. 3 is a flow chart illustrating an aspect of the present invention;

FIG. 4 is a flowchart illustrating another aspect of the present invention;

FIG. 5 is a flowchart illustrating another aspect of the present invention; and

DETAILED DESCRIPTION OF THE INVENTION

Figure 1A:
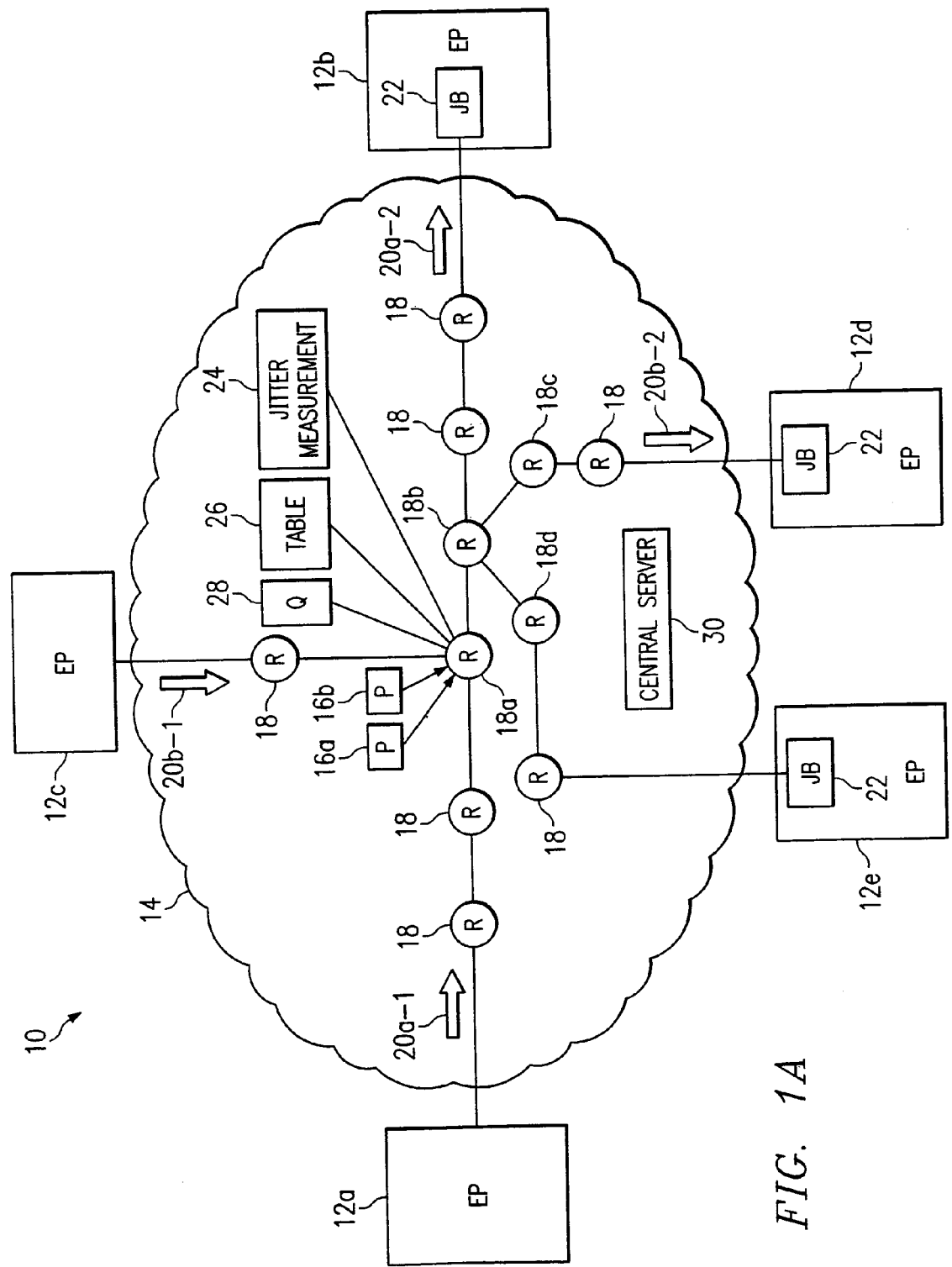
FIG. 1A illustrates one embodiment of a communication system incorporating teachings of the present invention.

FIG. 1A illustrates a communications system 10 that includes endpoints 12a, 12b, 12c, 12d and 12e (generally referred to as endpoints 12) that establish a communication session using a network 14. Each endpoint 12 maintains a plurality of compression/decompression modules (not shown) that compress, decompress, and otherwise process voice, video, data, and other information (generally referred to as media) exchanged between two or more of the endpoints 12. Endpoints 12 may also include jitter buffers 22.

The endpoints 12 may be any combination of hardware and/or software that provide communication services to a user. For example, the endpoint 12 may be a telephone, a computer running telephony software, a video monitor, a camera, or any other communication or processing hardware and/or software that supports the communication of packets 16 of media using the network 14. The endpoints 12 may also include unattended or automated systems, gateways, other intermediate components, or other devices that can establish media sessions. Although FIG. 1A illustrates five endpoints 12, the communication system 10 contemplates any number and arrangement of endpoints 12 for communicating media. For example, the described technologies and techniques for establishing a communication session between endpoints 12 may be adapted to establish a conference between more than two endpoints 12.

The network 14 may be a local area network (LAN), wide area network (WAN), global distributed network such as the Internet, intranet, extranet, or any other form of wireless or wireline communication network. Generally, the network 14 provides for the communication of packets, cells, frames, or other portion of information (generally referred to as packets 16) between the endpoints 12. The network 14 may include any combination of routers, hubs, switches, and other hardware and/or software implementing any number of communication protocols that allow for the exchange of packets in the communication system 10. In this application, the routers, hubs, switches and other hardware and/or software between the endpoints are referred to generally as routers 18. The packets 16 make up a media stream 20.

In a particular embodiment, the network 14 employs communication protocols that allow for the addressing or identification of the endpoints 12 coupled to the network 14. For example, using Internet protocol (IP), each of the components coupled together by the network 14 in the communications system 10 may be identified in information directed using IP addresses. In this manner, the network 14 may support any form and combination of point-to-point, multicast, unicast, or other techniques for exchanging media packets among components in the system 10. Due to congestion, component failure, or other circumstance, the network 14 may experience performance degradation in exchanging packets 16 between endpoints 12. One or more parameters reflect the performance of the network 14. These network parameters may include delay, jitter, packet fragmentation, packet loss, or any other measure that indicates or reflects the performance of the network 14. In a particular embodiment, the network parameter of jitter is assessed for each media stream 20 at each router 18 using the techniques known in the art using hardware and/or software. Jitter as used herein is the relative time shift among packets 16 in the media stream 20.

FIG. 1B illustrates jitter as it applies to the present invention. For example, an endpoint 12a may represent the point of origin of a media stream 20a. At the endpoint 12a, each packet 16 is spaced 20 msec from the preceding packet 16 in the media stream 20a as shown at the left side of FIG. 1B. The lengths of the packets 16 are not drawn to scale in FIG. 1B and would depend on the speed of the link. Through variable delays in routers 18, the packets 16 of the media stream 20a received near a final destination endpoint 12b no longer are equally spaced apart. This is illustrated at the right side of FIG. 1B. The arrow 20a-1 in FIG. 1A represents the first media stream 20a near the point or origin endpoint 12a and the arrow 20a-2 represents the first media stream 20a near the point of destination endpoint 12b. Some packets 16 may be received at the endpoint 12b less than 20 msec from the preceding packet while other packets may be received at the endpoint 12b more than 20 msec from the preceding packet.

Typically, the packets 16 received at the final destination endpoint 12b are placed in the jitter buffer 22 which can be implemented using hardware and/or software. In this example where the packets 16 were spaced 20 msec apart at the origination endpoint 12a, the jitter buffer 22 passes along each succeeding packet 20 msec from the transmission of the preceding packet 16 thereby restoring the original timing sequence. It is often desirable to minimize the number of packets 16 in the jitter buffer 22 at any one time. For example, it is especially desirable with respect to voice packets, in order to minimize the time delay between origination and receipt of a voice communication. However, having no packets 16 in the jitter buffer 22 during the transmission of a voice stream, results in the degradation of the perceived voice quality. Thus, reducing the size of the jitter buffer 22 must be balanced against ensuring that the jitter buffer does not empty completely.

In a particular embodiment, the overall adverse effect of the jitter at all the final destination endpoints 12, e.g., endpoints 12b and 12d, in the network are reduced. Other embodiments include reducing the overall adverse affects of jitter in video and other media.

FIG. 2 illustrates a flow chart of a method of the particular embodiment directed to voice packets. The method begins at step 200 where a router 18a receives a first voice packet 16a that is part of the first voice stream 20a between origination endpoint 12a and final destination endpoint 12b. At step 202, the amount of jitter of the first voice stream 20a at the router 18a is measured using a measuring system 24 (see FIG. 1) known in the art. Alternatively, rather than measure jitter directly, the number of routers 18 through which the packet 16a has traversed (i.e., the number of hops) can be used as a guide to the amount of jitter in the packet 16a. Typically, the more routers 18 through which the packet 16a has traversed, the more jitter would have been added to the packet, compared to other packets 16 of the same type having traversed through fewer routers. Thus, the number of routers can be used in lieu of direct jitter measurements. The number of hops can be determined from the header of the packet. Unless otherwise specified, in this disclosure reference to measuring jitter, such as by the measuring system 24, includes but is not limited to methods or systems for determining the number of routers 18 through which the packet 16 has traversed. Similarly, reference to measured jitter includes but is not limited to the number of routers 18 through which the packet 16 has traversed. That determined number of routers can be the basis for determining subpriorities for packets 16 as is further discussed in detail below.

The measurement of the jitter of the first media stream 20a is compared at step 204 to measurements in a table 26 of the jitter of other media stream 20 in a queue 28 associated with the router 18a for packets 16 awaiting transmission from the router. While each router 18 may be associated with its own plurality of jitter measuring systems 24, tables 26 and/or queues 28 in these particular embodiments, for simplicity, the measuring system, table and queue are shown only with respect to router 18a in FIG. 1. Further note that while the jitter measuring system 24, the table 26 and the queue 28 are shown as being external to the router 18a in FIG. 1, any or all of these components may be integral to the router. As known to those skilled in the art, each router 18 has many ports (not shown) and the router would thus have many queues 28, at least one per port. For simplicity, only one queue 28 is shown in FIG. 1. Each queue 28 typically would contain many packets 16 from many media streams 20. The table 26 and the queue 28 can be implemented using hardware and/or software. At step 206, the first voice packet 16a is positioned in the queue 28 at least in part based on the measurement of the jitter of the first media stream 20a, typically being placed in the queue ahead of other voice packets in media streams 20 with measurements of less jitter and behind other voice packets in media streams 20 with measurements of more jitter. Other factors may be considered by the system in determining the placement of the first voice packet 16a, such as the amount of time one or more of the other voice packets have been in the queue 28.

At step 208, the position of the first voice packet 16a in the queue 28 and the measurement of the jitter of the first media stream 20a is stored in the table 26. The process then returns to step 200, where the router 18a receives a second voice packet 16b that is part of a second media stream 20b between the origination endpoint 12c and the final destination endpoint 12d. The arrow 20b-1 in FIG. 1A represents the second media stream 20b near the point of origin endpoint 12c and the arrow 20b-2 represents the second media stream near the point of destination endpoint 12d. At step 202, the amount of jitter of the second media stream 20b is measured. At step 204, the measurement of the second media stream 20b is compared to the measurements in the table 26 of the jitter of the other media streams 20, including the first media stream 20a whose measurement is stored with the first voice packet 16a in the queue 28. At step 206, the second voice packet 16b is positioned in the queue 28 at least in part based on the measurement of the jitter of the second media stream 20b. The position in the queue of the second voice packet 16b and the measurement of its associated jitter is stored in the table 26 at step 208. For example, if the amount of jitter measured with respect to the second media stream 20b is greater than the amount of jitter measured with respect to the first media stream 20a, the second voice packet typically will be placed in the queue 28 ahead of the first voice packet even though the first voice packet reached the queue first. The process then returns to step 200, as necessary.

FIG. 3 illustrates another particular embodiment of the invention. At step 300, the amount of jitter added to a media stream 20a is measured by a third router 18c by means known to those skilled in the art. For example, the table 26 contains the measured amounts of jitter for each media stream 20 in the queue 28 as measured at the third router 18c. The amount of jitter measured at the third router 18c is communicated, in step 302, to the first router 18a. In step 304, the timing of the transmission of the packet 16a from the first router 15a via a second router 18b to the third router 18c is prioritized based at least in part on the amount of jitter measured at the third router. For example, were the amount of jitter associated with the media stream 20 as measured by the third router 18c to be higher than a specific threshold, the packet 16a may be moved higher in the queue 28 at the first router 18a for earlier transmission. The prioritization of packet transmission from the first router 18a may include an analysis of the measured amounts of jitter associated with a number of routers 18, in addition to the third router 18c. Accordingly, packet transmission from the first router 18a can be scheduled so as to reduce the amount of jitter introduced at the first router for a particular media stream 20, in this example, the packet 16a to be transmitted to the third router 18c via the second router 18b, at the expense of a second packet 16b to be transmitted to a fourth router 18d from the first router 18a via the second router 18b based on the information that a higher amount of jitter of the media stream 20a containing the packet 16a to be transmitted to the third router 18c will likely be introduced than with the second packet 16b to be transmitted to the fourth router 18d via the second router 18b. The amount of jitter associated with each router 18 can be communicated to all other routers 18 in the system, to a subset of all other routers 18 in the system or to one or more of the specific routers 18 through which the packet 16 is to be transmitted in its communication path between the endpoints 12.

FIG. 4 illustrates another particular embodiment in which, rather than having the routers 18 communicate the measured amount of jitter to other routers, the measured amount of jitter is first communicated to a central server 30 or software acting as a central server. In order to simplify FIG. 1, the connections between the central server 30 and each router 18 are not shown. At step 400, the amount of jitter at the router 18 is measured. At step 402, the measured amount of jitter is communicated to the central server 30. At step 404, the central server 30 analyzes the relative measured amounts of jitter in two or more media streams measured in the plurality of routers 18. The central server 30 prioritizes the transmission of packets 16 at step 406 from the routers 18 so as to reduce overall perceived jitter in the system 10, or alternatively in a subset of the system. In other words, because the central server 30 is cognizant of the amount of jitter that will be added at each router 18 in the system 10, the central server can reduce the amount of jitter introduced at certain routers 18 for certain packets 16 that are more likely to yield the detrimental audible effects of jitter at the expense of increasing the cumulative amounts of jitter in packets 16 that are less likely to yield the noticeable audible adverse effects of jitter. Note, this does not address adding jitter to, e.g., video in order to reduce the jitter to voice. Rather jitter and delay are added to voice packets with low jitter and delay in order to reduce the jitter and delay in voice packets that have higher jitter and delay.

FIG. 5 illustrates yet another particular embodiment of the invention wherein the transmission of the packet 16a is timed at least in part by the analysis of the amount of jitter of the media stream 20a prior to being received at the router 18a compared to other media streams 20 received by the router 18a and at least in part by the analysis of the amount of jitter that is likely to be introduced at routers which are expected to subsequently receive the packet. At step 500, the first router 18a receives the first voice packet 16a from the first media stream 20a. At step 502, the amount of jitter in the first media stream 20a is measured by the jitter measurement system 24. At step 504, the jitter measurement of the first media stream 20a is compared to the measurement of jitter in other media streams 20 in the queue 28. The amount of jitter added to the media stream 20a by the third router 18c in the projected path of the first media stream 20a is measured at step 506. The amount of jitter added by the third router 18c to the media stream 20a is communicated at step 508 to the first router 18a. At step 510, the amount of jitter added to the media stream 20a by the third router 18c is assessed and compared to the measured amount of jitter, if available, associated with other routers 18. At step 512, the first voice packet 16a is positioned in the queue 28 of the first router 18a based at least in part on the jitter comparison of the packets 16 in the queue 28 of the first router 18 and based at least in part on the amount of jitter measured at the third router 18c. At step 514, the position of the first voice packet 16a in the queue 28 and the measurement of the jitter of the first media stream 20a at the first router 18a is stored in the table 28.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for self-regulating quality of service in a communications network, comprising:
   receiving a first measurement of an amount of jitter of a first media stream of packets at a central server;
   receiving a second measurement of an amount of jitter of a second media stream of packets at the central server; and
   prioritizing, at the central server, transmission of the first media stream of packets and the second media stream of packets in accordance with the first measurement and the second measurement.

2. The method of claim 1, further comprising reducing an overall perceived jitter effect in accordance with prioritization of the transmission of packets.

3. The method of claim 2, wherein reducing an overall perceived jitter effect comprises:
   increasing an amount of jitter in the first media stream of packets having a first amount of jitter; and
   reducing the amount of jitter in the second media stream of packets having a second amount of jitter, the first amount of jitter less than the second amount of jitter.

4. The method of claim 2, wherein reducing an overall perceived jitter effect comprises:
   increasing a level of delay in the first media stream of packets having a first level of delay; and
   reducing the level of delay in the second media stream of packets having a second level of delay, the first level of delay less than the second level of delay.

5. A system for self-regulating quality of service in a communications network, comprising:
   means for receiving a first measurement of an amount of jitter of a first media stream of packets at a central server;
   means for receiving a second measurement of an amount of jitter of a second media stream of packets at the central server; and
   means for prioritizing, at the central server, transmission of the first media stream of packets and the second media stream of packets in accordance with the first measurement and the second measurement.

6. The system of claim 5, further comprising means for reducing an overall perceived jitter effect in accordance with prioritization of the transmission of packets.

7. The system of claim 6, wherein means for reducing an overall perceived jitter effect comprises:
   means for increasing an amount of jitter in the first media stream of packets having a first amount of jitter; and
   means for reducing the amount of jitter in the second media stream of packets having a second amount of jitter, the first amount of jitter less than the second amount of jitter.

8. The system of claim 6, wherein means for reducing an overall perceived jitter effect comprises:
   means for increasing a level of delay in the first media stream of packets having a first level of delay; and
   means for reducing the level of delay in the second media stream of packets having a second level of delay, the first level of delay less than the second level of delay.

9. A computer readable medium including logic for self-regulating quality of service in a communications network, the logic operable to:
- receive a first measurement of an amount of jitter of a first media stream of packets at a central server;
- receive a second measurement of an amount of jitter of a second media stream of packets at the central server; and
- prioritize, at the central server, transmission of the first media stream of packets and the second media stream of packets in accordance with the first measurement and the second measurement.

10. The computer readable medium of claim 9, the logic further operable to reduce an overall perceived jitter effect in accordance with prioritization of the transmission of packets.

11. The computer readable medium of claim 10, wherein reducing an overall perceived jitter effect comprises logic operable to:
- increase an amount of jitter in the first media stream of packets having a first amount of jitter; and
- reduce an amount of jitter in the second media stream of packets having a second amount of jitter, the first amount of jitter less than the second amount of jitter.

12. The computer readable medium of claim 10, wherein reducing an overall perceived jitter effect comprises logic operable to:
- increase a level of delay in the first media stream of packets having a first level of delay; and
- reduce a level of delay in the second media stream of packets having a second level of delay, the first level of delay less than the second level of delay.

13. A system for self-regulating quality of service in a communications network, comprising:
- a first router operable to send a first measurement of an amount of jitter of a first media stream of packets;
- a second router operable to send a second measurement of an amount of jitter of a second media stream of packets; and
- a central server coupled to the first router and the second router, the central server operable to:
  - receive the first measurement and the second measurement of the amount of jitter; and
  - prioritize transmission of the first media stream of packets and the second media stream of packets in accordance with the first measurement and the second measurement.

14. The system of claim 13, the central server further operable to reduce an overall perceived jitter effect in accordance with prioritization of the transmission of packets.

15. The system of claim 14, the central server further operable to:
- increase an amount of jitter in the first media stream of packets having a first amount of jitter; and
- reduce an amount of jitter in the second media stream of packets having a second amount of jitter, the first amount of jitter less than the second amount of jitter.

16. The system of claim 14, the central server further operable to:
- increase a level of delay in the first media stream of packets having a first level of delay; and
- reduce a level of delay in the second media stream of packets having a second level of delay, the first level of delay less than the second level of delay.

17. A system for self-regulating quality of service in a communications network, comprising:
- means for measuring an amount of jitter of a first media stream received in a first router;
- means for comparing the amount of jitter of the first media stream received in the first router to the amount of jitter of at least one other media stream received in the first router;
- means for receiving at the first router a measurement of the amount of jitter associated with the first media stream at a third router;
- means for prioritizing timing of a transmission of a voice packet in the first media stream from the first router via a second router toward the third router based at least in part on results of the comparing step the amount of jitter of the first media stream to the amount of jitter of at least one other media stream and at least in part on the amount of jitter associated with the first media stream at the third router; and
- means for storing the measurement of jitter of the first media stream and the at least one other voice media stream.

18. The system of claim 17, further comprising means for measuring the amount of jitter associated with the first media stream at the third router that is to receive the voice packet.

19. The system of claim 17, wherein means for prioritizing comprises means for optimizing quality of service.

20. The system of claim 17, wherein means for prioritizing comprises means for timing the transmission of the voice packet before the transmission of a voice packet in the at least one other media stream when the first media stream has a greater amount of jitter than the at least one other media stream.

21. The system of claim 17, wherein the first media stream has traversed through a plurality of routers, wherein means for measuring comprises means for determining a number of routers through which the packet has traversed and wherein the number of routers represents the amount of jitter.

22. A computer readable medium including logic for self-regulating quality of service in a communications network, the logic operable to:
- measure an amount of jitter of a first media stream received in a first router;
- compare the amount of jitter of the first media stream received in the first router to the amount of jitter of at least one other media stream received in the first router;
- receive at the first router a measurement of the amount of jitter associated with the first media stream at a third router;
- prioritize timing of a transmission of a voice packet in the first media stream from the first router via a second router toward the third router based at least in part on results of the comparing step the amount of jitter of the first media stream to the amount of jitter of at least one other media stream and at least in part on the amount of jitter associated with the first media stream at the third router; and
- store the measurement of jitter of the first media stream and the at least one other voice media stream.

23. The computer readable medium of claim 22, the logic further operable to measure the amount of jitter associated with the first media stream at the third router that is to receive the voice packet.

24. The computer readable medium of claim 22, wherein prioritizing comprises logic operable to optimize quality of service.

25. The computer readable medium of claim 22, wherein prioritizing comprises logic operable to time the transmission of the voice packet before the transmission of a voice packet in the at least one other media stream when the first media stream has a greater amount of jitter than the at least one other media stream.

26. The computer readable medium of claim 22, wherein the wherein the first media stream has traversed through a plurality of routers, wherein measuring comprises logic operable to determine a number of routers through which the packet has traversed and wherein the number of routers represents the amount of jitter.

* * * * *